United States Patent

[11] 3,617,055

| [72] | Inventor | Sture Walter Stal<br>Solna, Sweden |
| --- | --- | --- |
| [21] | Appl. No. | 732,243 |
| [22] | Filed | May 27, 1968 |
| [45] | Patented | Nov. 2, 1971 |
| [73] | Assignee | AB Bonnierforetagen<br>Stockholm, Sweden |
| [32] | Priority | May 30, 1967 |
| [33] | | Sweden |
| [31] | | 7553/67 |

[54] CONVEYOR FOR SIGNATURES
8 Claims, 10 Drawing Figs.

[52] U.S. Cl. ..................................................... 271/88,
93/93 DP, 214/6 H
[51] Int. Cl. ......................................................... B65h 33/00
[50] Field of Search ............................................. 271/3, 34,
88, 68; 93/93.3; 198/156, 20; 214/6 H

[56] References Cited
UNITED STATES PATENTS

| 2,592,642 | 4/1952 | Bardet................... | 214/6 H |
| --- | --- | --- | --- |
| 2,737,390 | 3/1956 | Morgan et al........... | 271/68 |
| 2,819,661 | 1/1958 | Howdle et al........... | 93/93.3 |
| 3,418,895 | 12/1968 | Palmer.................... | 93/93.3 UX |
| 3,429,239 | 2/1969 | Murchison et al...... | 271/88 X |
| 3,069,157 | 12/1962 | Mersereau et al...... | 271/34 X |
| 3,255,895 | 6/1966 | Klinger................... | 271/88 X |
| 3,088,604 | 5/1963 | Nilsson................... | 93/93.3 |

Primary Examiner—Richard E. Aegerter
Assistant Examiner—Douglas D. Watts
Attorney—Ostrolenk, Faber, Gerb & Soffen ABSTRACT: A conveyor for newspapers and like signatures capable of accepting signatures delivered to the conveyor in a continuous stream and being arranged in overlapping fashion. The infeed conveyor section of the assembly is tilted at a point intermediate its upstream and downstream ends forming a bend which, together with a squeeze roller arrangement, acts to remove air captured between the pages of the signatures as well as between adjacent signatures. The downstream portion of the infeed conveyor is inclined at an angle which greatly facilitates stacking of the signatures upon buckets provided therefor, even though the rate of flow of signatures through the infeed conveyor is greatly reduced. The lower conveyor provided in the downstream portion thereof is made adjustable so that a portion thereof is positioned substantially parallel to and in close proximity to signatures being stacked upon each bucket to promote the formation of neat stacks upon the bucket. The adjustability feature permits the parallel portion to be moved closer toward or further away from the buckets, in accordance with signatures of smaller or larger dimensions, respectively. The tines of the bucket are made adjustable to permit their forward ends to be positioned in substantially the same spaced relationship relative to the parallel section of the above-mentioned lower conveyor to facilitate the formation of signature stacks of the exact count desired. The forward end of the bucket tines, when in the intercept position, is slightly above and in very close proximity to the incoming signature stream to enable rapid intercept of the stream immediately upon receipt of an intercept signal. The upper and lower conveyors provided in the downstream section of the infeed conveyor are movably mounted relative to one another. However, the roller of the upper conveyor closest to the forward tines of the bucket is mounted in a stationary fashion, while the roller of the lower conveyor closest to the forward end of the bucket tines is resiliently loaded by spring loading means to assure the application of firm squeezing pressure upon the signature stream passing therebetween. The stationary mount of the roller in the upper conveyor closest to the forward end of the bucket tines enables very close positioning of the forward end of the bucket tines to the incoming stream, even though the two above-mentioned rollers are free to move relative to one another as the signature stream passes therebetween.

Sensing means is provided in the downstream section of the infeed conveyor for preventing operation of the stacker in the absence of signatures passing through the infeed conveyor downstream section. Additional means are provided for stopping operation of the stacker in the case where a signature becomes intertwined with the bucket tines as the bucket passes through the outfeed conveyor section.

CONVEYOR FOR SIGNATURES

The present invention relates to article conveyors and more particularly to a novel conveyor and stacker for newspapers and other like signatures which is capable of being rapidly adjusted for conveying and stacking signatures of varying dimensions and wherein very accurate bundle counts are produced as a result of the design of the infeed conveyor section which acts to effectively remove air from the signatures fed therethrough, which facilitates rapid interception of the signature stream by the stacker buckets and which promotes the formation of neatly stacked signature bundles through the use of the adjustable conveyor.

The rapid development of high-speed machinery in the graphic arts industry has reached a point where signatures such as, for example, newspapers are capable of being printed, collated, folded and fed out in a continuous stream at rates of better than 70,000 per hour. With the advent of such developments, conventional techniques of removing signatures from the outgoing stream and stacking them in bundles of accurate counts have become obsolete and require the provision of high-speed machinery capable of accepting a signature stream and forming stacked bundles therefrom, each of which bundles contains the required accurate count of signatures. While there is presently available machinery for automatically carrying out such functions, such machinery nevertheless has numerous shortcomings. For example, it is difficult under present-day techniques to be assured that each bundle of signatures which is formed by separation of the incoming stream contains the desired amount of signatures. Also, it is desired to be capable of providing such automatic machinery which is adaptable to separate and stack signatures of varying dimensions and counts.

The present invention teaches a novel conveyor and stacker for separating and stacking signatures of varying dimensions, and which includes means for more suitable handling of the signatures to greatly enhance the formation of neatly stacked bundles each containing an accurate count.

The present invention is comprised of an infeed conveyor section having upstream and downstream portions thereof which are tilted relative to one another to cause the signatures passing therethrough to be bent in order to remove any air captured between the pages of a signature or between adjacent signatures, thereby facilitating the separating and stacking operation. Additional squeeze roller means are provided in the upstream section of the conveyor to squeeze the incoming signature stream to further facilitate compression of each signature. The downstream section of the infeed conveyor is tilted at an angle which greatly facilitates delivery of the signatures to the stacking buckets in order to assure neat, proper stacking, regardless of the press speeds being utilized in the delivery of signatures to the stacker.

The downstream end of the infeed conveyor downstream section is comprised of upper and lower conveyors which receive and pass the signatures fed therebetween toward the stacking buckets. Cooperating rollers provided in the upper end lower conveyors are movable relative to one another to automatically adjust the separation therebetween as a result of either sudden or gradual changes in the thickness of the signature stream, while at the same time subjecting the signature stream passing therethrough to firm compression.

The stacking portion of the assembly is comprised of buckets mounted upon continuous drive chains to cause the buckets to move in a direction transverse to the incoming signature stream and to intercept and separate the signature stream, causing signatures to be stacked upon that bucket moving through the stacking region at any given time. In order to assure rapid, clean and accurate interception of the signature stream, it is necessary to position each bucket in the intercept position as close as possible to the signature stream just before interception of the signature stream so that the travel distance for interception is quite small. This function is facilitated by mounting the above-mentioned roller of the upper conveyor in a stationary fashion while mounting the roller of the lower conveyor in a floating fashion, thereby enabling the forward ends of the bucket tines to be positioned as close to the signature stream as possible when in the intercept position without fear of the possibility that incoming signatures will be so deflected as to strike against the bucket in the intercept position and thereby disrupt the stacking operation, which harmful result would otherwise occur if the roller of the upper conveyor were mounted in a free-floating fashion.

The lower conveyor of the infeed conveyor downstream section is provided with a pair of rollers about which the conveyor belts are entrained and which align the conveyor belts passing therebetween so as to be substantially parallel to and in close proximity to the signature bundle being formed to thereby promote the formation of a neatly stacked bundle. The adjustability of the rollers allows the conveyor belt section passing therebetween to be positioned closer toward the stacking region or further away from the stacking region for smaller or larger signature sizes, respectively. The tines of each bucket receiving signatures are adjustable to position the forward free ends thereof as close as possible to the downstream section lower conveyor to permit interception of the signature stream before the signatures bend as a result of their own weight and before signatures experience free fall. A pair of vibrating jostling plates are provided along opposite sides of the buckets as they pass through the stacking region for the purpose of maintaining the signatures being delivered to the bucket receiving signatures in aligned fashion to form a neat bundle. Additional belts, which are entrained around suitable pulleys, move through the stacking region at a rate somewhat faster than the movement of the buckets through the stacking regions to compress the forward end of the signatures downwardly as each bundle is being formed. The jostling plates of the conveyor belts of the lower conveyor and the back portions of each bucket act to confine the signatures being stacked and cooperate to form neat signature bundles.

The incoming signatures are sensed and counted by suitable counting means which generates a pulse indicative of the fact that the appropriate number of signatures has been stacked upon a bucket. This signal is imposed upon a latching mechanism which latches the next bucket to be stacked just before the interception operation to thereby release the bucket which, through the provision of a lost-motion mechanism, very rapidly accelerates downwardly to intercept the signature stream, causing a clean, separation and thereby assuring the formation of bundles of an accurate count.

The downstream section of the infeed conveyor is further provided with a sensor which automatically shuts off the stacker, thereby detecting the absence of signatures passing therebeneath. Additional sensor means of a similar design is positioned slightly above the outfeed conveyor section for detecting the presence of a signature which may have intertwined itself between the tines of a loaded bucket which would otherwise prevent movement of the stacked bundle from the loaded bucket by means of the outfeed conveyor section.

It is, therefore, one object of the present invention to provide a novel conveyor for signatures, and the like, which is capable of stacking signatures of a variety of different sizes.

Another object of the present invention is to provide an assembly for separating and stacking signatures from an incoming stream which are arranged in overlapping fashion and which includes an infeed conveyor comprised of two tilted sections for bending signatures passing therethrough to facilitate compression of the signatures prior to the stacking operation.

Another object of the present invention is to provide a novel infeed conveyor including a mangle roller assembly and a pair of tilted sections for bending signatures passing therethrough, both of which assemblies act to facilitate compression of signatures.

Still another object of the present invention is to provide a novel infeed conveyor section for signature stackers, and the like, comprised of a downstream section which is adjustable to position its conveyor belts in close alignment to the signatures being stacked to promote the stacking of neat bundles.

Yet another object of the present invention is to provide a novel infeed conveyor section for signature stackers, and the like, comprised of a downstream section which is adjustable to position its conveyor belts in the close alignment to the signatures being stacked to promote the stacking of neat bundles, and further comprising a stacking section having stacking buckets with adjustable tines to facilitate the stacking of signatures of varying dimensions.

Still another object of the present invention is to provide a novel conveying and stacking assembly comprised of an infeed conveyor positioned in close proximity to the stacking buckets and having a pair of cooperating upper and lower rollers wherein the upper roller is mounted in a relatively stationary fashion while the lower roller is mounted in a free-floating fashion to enable very close accurate positioning of the forward end of the bucket tines to the incoming signature stream, thereby promoting the clean, rapid interception of the stream by the moving buckets.

Yet a further object of the present invention is to provide a novel conveying and stacking assembly comprised of an infeed conveyor positioned in close proximity to the stacking buckets and having a pair of cooperating upper and lower rollers wherein the upper roller is mounted in a relatively stationary fashion while the lower roller is mounted in a free-floating fashion to enable very close accurate positioning of the forward end of the bucket tines to the incoming signature stream, thereby promoting the clean, rapid interception of the stream by the moving buckets, and further comprising means for sensing the absence of signatures passing through the infeed conveyor for stopping the machine.

These as well as other objects of the present invention will become apparent when reading the accompanying description and drawings in which.

Figure 1:
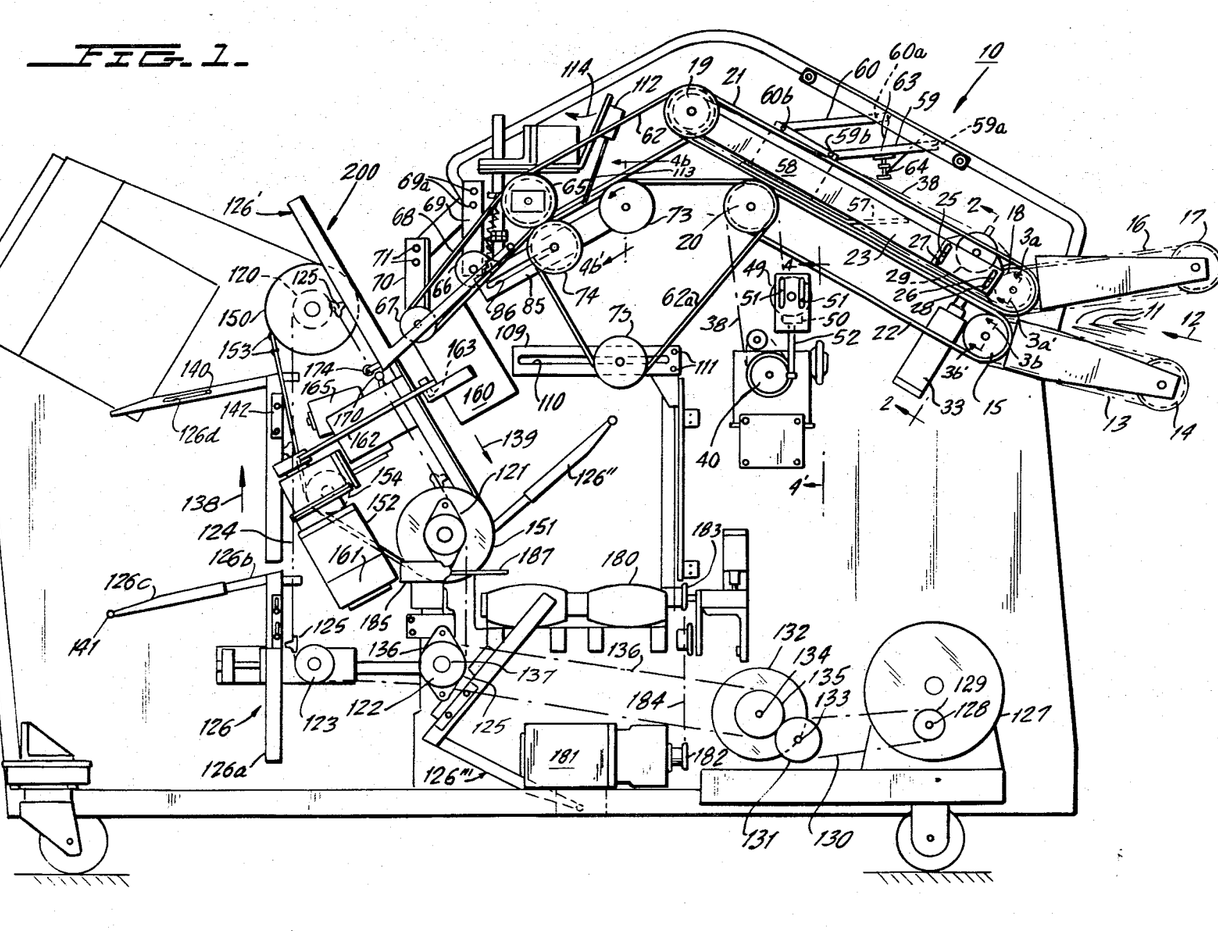
FIG. 1 is an elevational view showing the pertinent components of the present invention.

Referring now to the drawings and particularly to FIG. 1, there is shown therein an assembly 10 for conveying, separating and stacking signatures 11 moving in the direction shown by arrow 12 and arranged in overlapping fashion with their folded edges (or binded edges, as the case may be) forward. The signature stream is supported by a lower conveyor comprised of conveyor belts or wires 13 entrained about rollers 14 and 15 mounted upon suitable shafts. An upper conveyor which is comprised of belts or wires 16 entrained about rollers 17 and 18 forms a tapering entry for the signatures. The forward ends of the signatures come in contact with the upper and lower conveyor belts 13 and 16 as their forward folded edges come in close proximity to rollers 15 and 18. The rollers 15 and 18 further cooperate with rollers 19 and 20 which have entrained therearound conveyor belts 21 and 22, respectively, which are arranged above and below the signature stream to advance the signature stream through the infeed conveyor and toward the stacking region.

Since the signatures being advanced toward the assembly normally have captured air between their plurality of pages as well as between adjacent signatures, it is very important, for the purpose of enhancing the separating and stacking operations to compress the signatures as much as possible prior to the separation and stacking activities.

Figure 2:
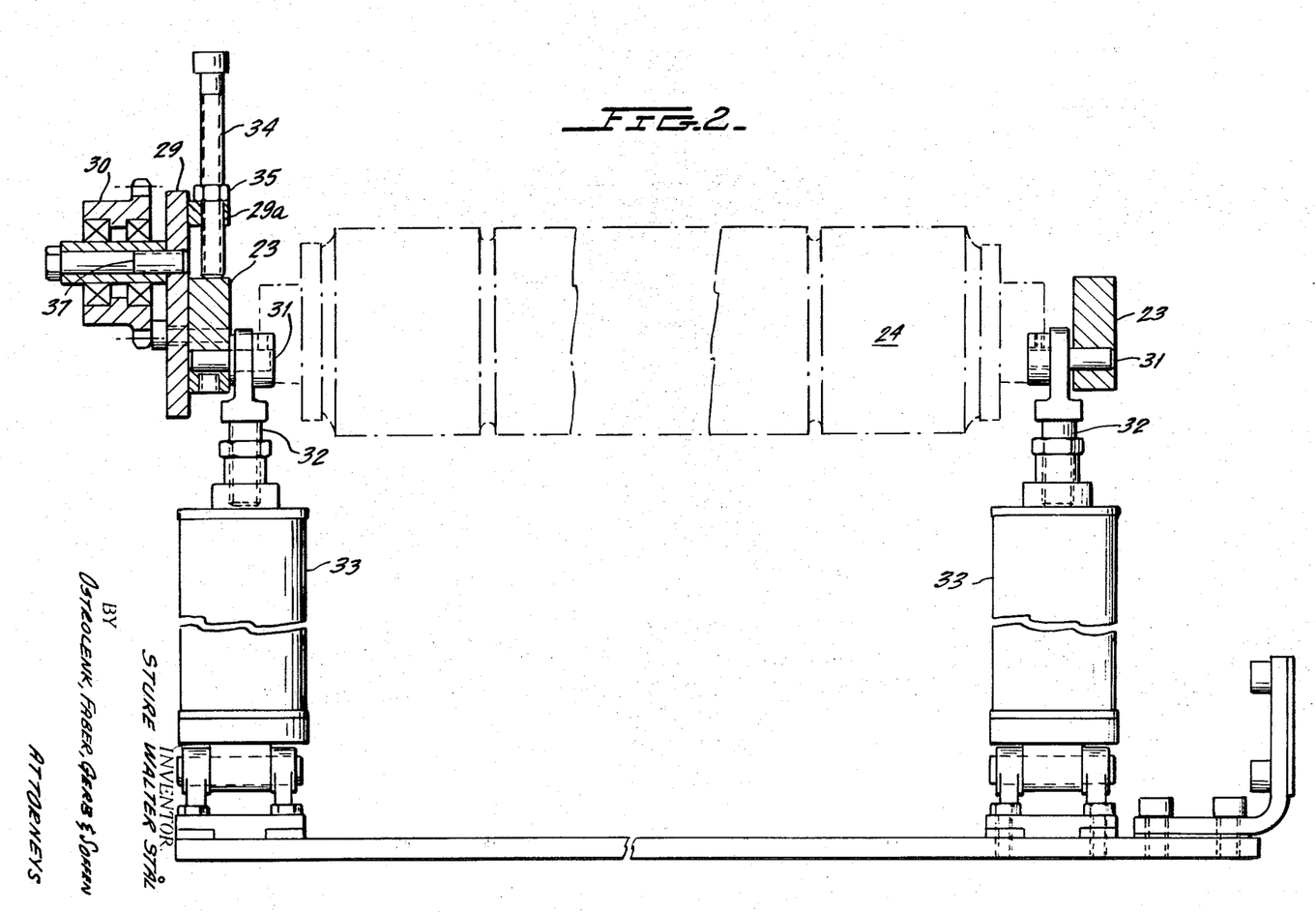
FIG. 2 is a view taken along the line 2—2' of FIG. 1 showing the mangle roller assembly in greater detail.

Considering FIGS. 1 and 2, there is shown therein a mangle roller assembly comprised of a pair of rigid, elongated plates 23 pivotally mounted about the shaft supporting roller 19. The opposite ends of these plates support a shaft which rotatably supports upper mangle roller 24 which is shown best in FIG. 3a. Each of the plates is provided with a pair of pins 25 and 26 which extend through guide slots 27 and 28 provided in a pair of plates 29 which, in turn, are rigidly secured to the conveyor frame. One of the plates has pivotally mounted thereto a sprocket 30 for the purpose of driving the infeed conveyors in a manner to be more fully described. The rigid plates are further provided with pins 31 for pivotally securing the upper end of piston rods 32,32 thereto, which piston rods cooperate with air cylinders 33,33 for urging the piston rods in the downward direction, causing the rigid elongated plates 23 to be urged to the downward direction. Since upper mangle roller 24 is coupled to the right-hand ends of elongated plates 23,23 this roller is, in turn, urged downwardly toward lower mangle roller 15 (shown in FIG. 3b) to exert an extremely large amount of compression upon the signature stream passing therebetween. The elongated plates 23,23 thereby act as lever arms. The length of these layer arms greatly contributes to the compression capabilities of the structure. Plate 29 has secured thereto an elongated threaded member 34 which controls the maximum lifting which the lever arms may undergo. The threaded member 34 threadedly engages a suitable tapped opening provided in projection 29a of plate 29. The position of threaded member 34 is positively and rigidly maintained by use of a fastening nut 35. The sprocket 30 pivotally mounted upon plate 29 by assembly 37 cooperates with a chain 38 entrained about additional sprockets mounted upon the shafts which support rollers 15, 18, 19 and 20. The sprockets (with the exception of sprocket 30) are all keyed to their respective shafts as are their rollers so as to rotate in unison. The drive means for operation of the conveyor is shown in FIG. 4, and is comprised of an infeed drive motor 40 coupled through a variator 41 manually adjustable by control knob 42 which provides a 9:1 ratio between the speed of the output of drive motor 40 and the output shaft 43 of variator 41. A sprocket 44 is keyed to shaft 43 by a setscrew 45. The drive chain 38 is entrained about sprocket 44, and is further entrained about sprocket 46 mounted for freewheeling rotation about a shaft 47 which, in turn, is secured to a plate 48. The plate 48 is adjustably mounted by fastening means 49 to a support plate 50 provided with elongated slots 51. The positioning of sprocket 46, and hence plate 48, relative to the elongated slots 51 is selected so as to provide proper tensioning for the drive chain 38. The positioning of plate 48 is maintained by means of an elongated threaded member 52 which threadedly engages a tapped aperture 53 provided in projection 54. The upper end of threaded member 52 bears against a projection 55 provided on plate 48 to prevent any downward movement of plate 48 under the tension of drive chain 38. The positioning of threaded member 52 is secured by nut 56 which may be tightened after setting the position of threaded member 52.

The incoming signature stream which is normally driven through the infeed conveyor at a rate faster than movement of the signature stream entering the conveyor, passes beneath the runner 57 of a sensor-counting mechanism 58 which is suspended from the machine frame by means of two rods 59 and 60 which are pivotally mounted at their upper ends 59a and 60a to the machine frame and which are pivotally mounted at their lower ends 59b and 60b to the upper end of the counter. The counter 58 is mounted in a substantially free-floating fashion riding upon the incoming signature stream and urged downwardly substantially by its own weight. The incoming signature stream passes beneath the runner 57 and the forward folded edges "kick" projecting pins (not shown) extending downwardly from the sensor counter causing them to be rotated in incremental fashion for the purpose of counting the number of signatures passing therebeneath. The conveyor belts positioned about the rollers are in actuality wires which are entrained about the rollers. For example, considering FIGS. 3a and 3b which show the rollers 15 and 24, the conveyor belts are comprised of wires 62 having a certain degree of resiliency which are received within annular grooves provided in each roller. Considering the rollers 15 and 24 of FIGS. 3a and 3b, it can be seen that these grooves 15a and 24a, respectively, are substantially semicircular in shape to facilitate receipt of the conveyor wires 62. The sensor counter is substantially centrally located at a point intermediate the ends of the rollers 18 and 19, and is positioned intermediate the rollers 18 and 19 of the upper conveyor section. The maximum downward positioning of the counter is adjustably determined by the resilient spring means 63 secured to the upper portion of the machine frame and provided with an adjustable threaded member 64 whose upper end bears against member 59 to limit the downward movement experienced by member 59 and hence by counter 58. The counter 58 generates output pulses after each predetermined count is achieved, which count is adjustable dependent upon the number of signatures to be stacked in each bundle, and the operation of the counter will become more apparent in the ensuing description.

Figure 3A:
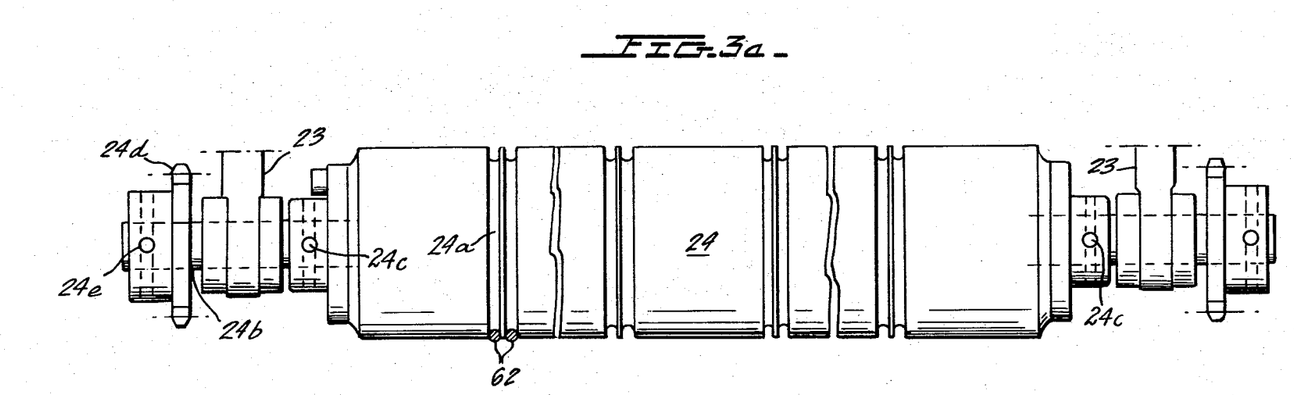
FIGS. 3a and 3b are views of the mangle rollers looking in the direction of arrows 3a—3a' and 3b—3b' of FIG. 2.
Figure 3B:
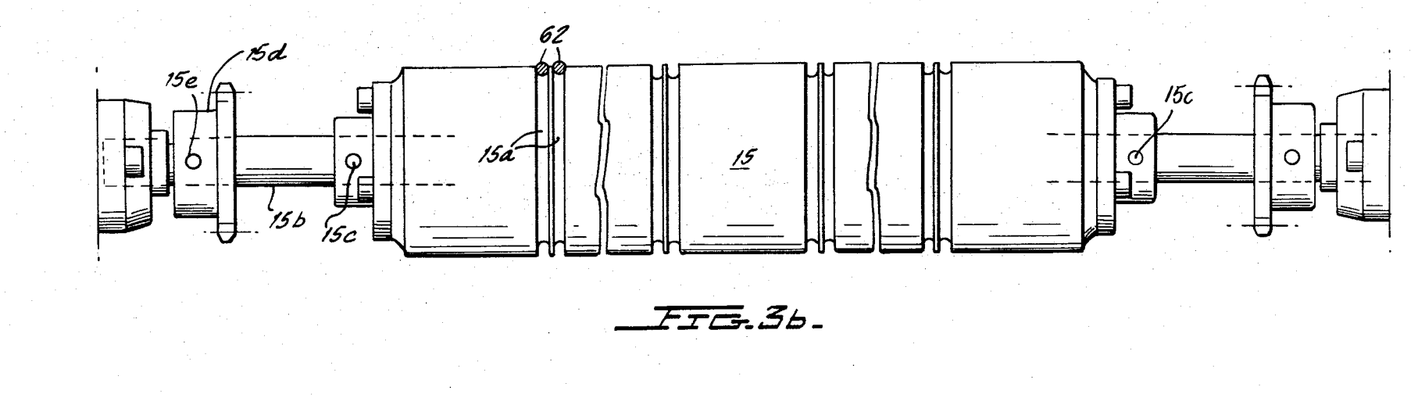
Figure 4:
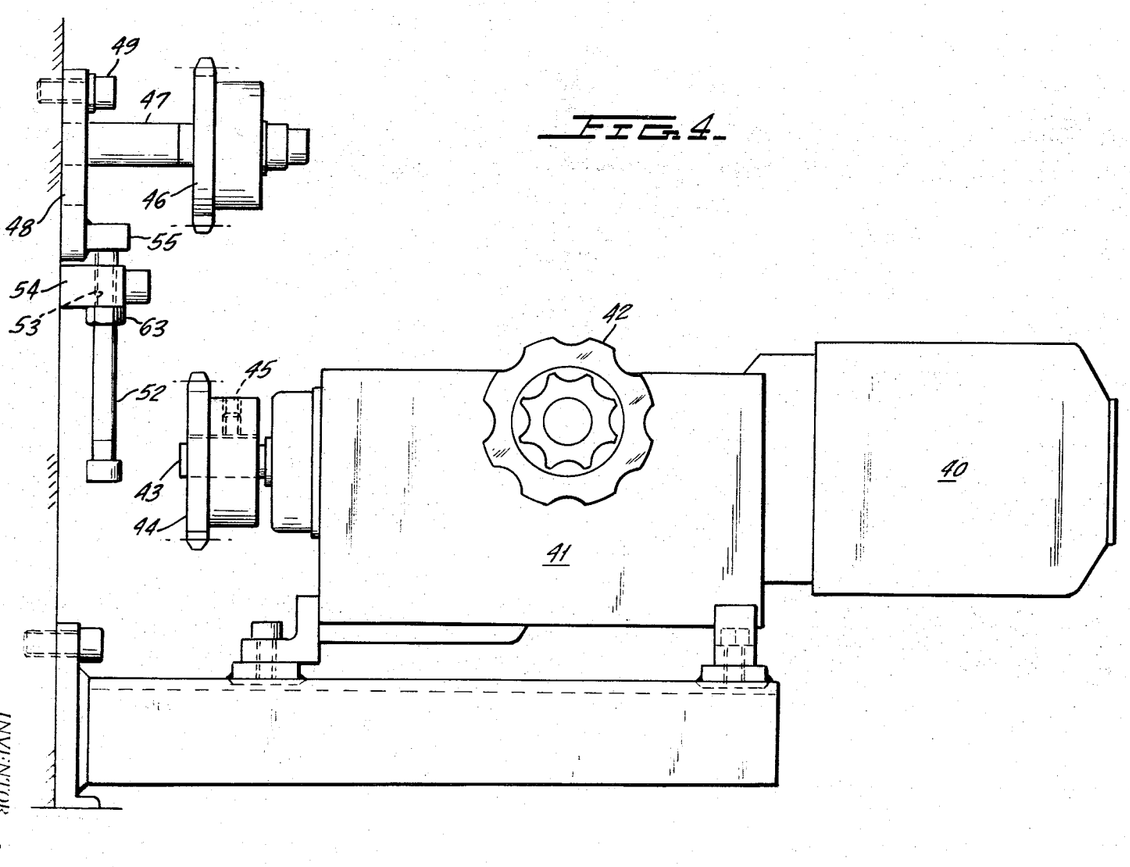
FIG. 4 is a view looking in the direction of arrows 4—4' of FIG. 1.

Rollers 24 and 15, shown in FIGS. 3a and 3b, can be seen to be keyed to their respective shafts 24b and 15b, respectively, by means of setscrews 24c and 15c. The sprockets 24d and 15d are likewise keyed to their respective shafts by setscrews 24e and 15e, respectively, so that the drive chain 38 entrained around these sprockets rotates the sprockets, the shafts and the rollers in unison.

The downstream section of the infeed conveyor is comprised of rollers 19, 65, 66 and 67 having conveyor wires 62 and 68 entrained therearound, such that the wires 62 are entrained about rollers 19 and 65 and further conveyor wires 68 are entrained around rollers 65, 66 and 67. The rollers 19 and 65 are positioned so that the conveyor wires 62 form an angle of the order of 30° with the horizontal direction. The remaining section of the upper conveyor forms a larger angle with the horizontal direction. Roller 66 is mounted upon plate 69 which is secured at its upper end by fastening means 69a to the machine frame and may be adjusted in either the upward or downward vertical direction to maintain proper tension upon the conveyor wires passing around roller 66. The positioning of rollers 66 and 67 which are mounted upon a plate 70 by fastening members 71 further serve to control the angle at which the signatures are fed into the stacking buckets to be more fully described.

The lower conveyor portion of the downstream section is comprised of rollers 20, 73, 74 and 75. A plurality of conveyor wires 62a are entrained about these rollers in the same manner as was previously described.

Figure 4A:
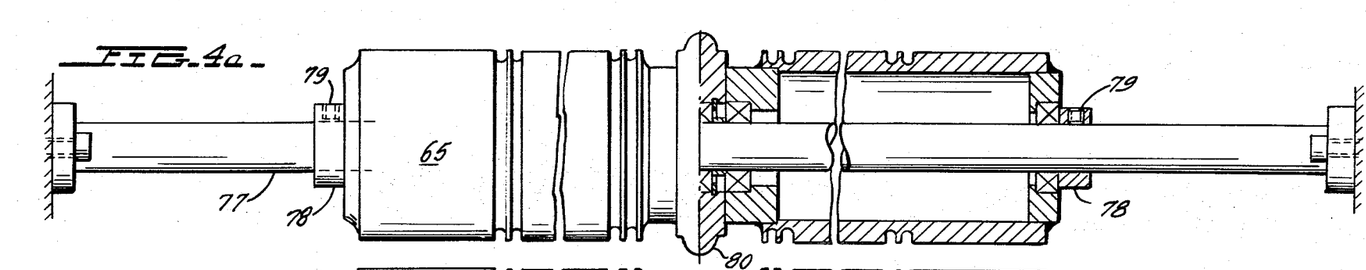
FIG. 4a is a view of one roller shown in FIG. 1 looking in the direction of arrows 4a—4a'.
Figure 4B:
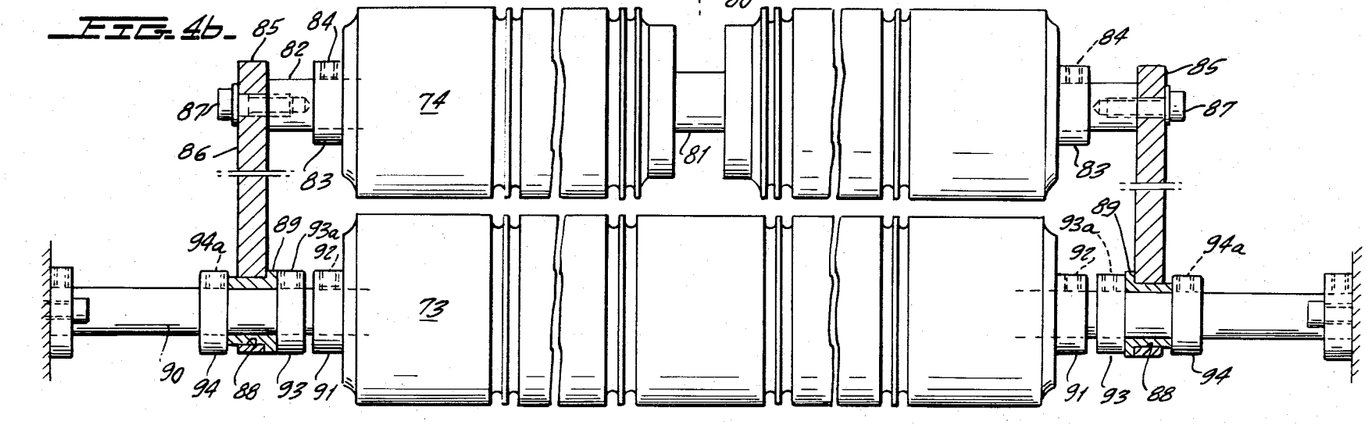
FIG. 4b is a view of a pair of rollers shown in FIG. 1 looking in the direction of arrows 4b—4b'.

Rollers 65 and 73-74 are shown in greater detail in FIGS. 4a and 4b, respectively. The roller 65 is mounted in a freewheeling fashion upon shaft 77. Members 78 positioned on opposite sides of roller 65 are keyed to shaft 77 by setscrews 79 for the purpose of preventing any lengthwise movement of roller 65 along shaft 77. The center portion 80 of roller 65 can clearly be seen to be of greater diameter than the remaining portion of roller 65 and this center portion 80 cooperates with a center section 81 of reduced diameter in roller 74 to form a bend in the signatures passing therebetween. Considering FIG. 1, it can be seen that the rollers 65 and 74 compress the signature stream passing therebetween, causing the intermediate portion of each signature passing therethrough to have a bend formed as the result of the cooperating portions 80 and 81 of rollers 65 and 74, respectively. Roller 65, while being free to experience rotation about its longitudinal axis, is rigidly secured to the machine frame so as to experience no movement in a direction transverse to its longitudinal axis. Roller 74, however, which is mounted upon shaft 82 is free to experience some movement transverse to its longitudinal axis.

The roller 74 is restrained from any lengthwise movement along shaft 82 by members 83 which are keyed to the shaft by setscrews 84. The shaft 82 is secured to a pair of rigid elongated plates 85 each of which is provided with an elongated slot 86 for receiving the fastening members 87 for securing shaft 82. Each of the plates 85 are provided with openings 88 at their right-hand ends which receive a collar 89 which, in turn, are positioned along shaft 90 which rotatably supports roller 73. The roller 73 is prevented from experiencing any lengthwise movement along shaft 90 by members 91 which are keyed to shaft 90 by setscrews 92. Each of the collars 89 are prevented from experiencing any lengthwise movement along shaft 90 by a pair of stop members 93–94 each of which is provided with a setscrew 93a–94a for keying these members to shaft 90.

While the shaft 90 is rigidly secured to the machine frame so as to prevent roller 73 from experiencing any movement in a direction transverse to its longitudinal axis, shaft 82 and its associated roller 74 are free to experience such transverse movement as a result of the pivotal mounting of plates 85 about shaft 90. The forward ends of elongated members 85 are provided with fastening means 95, as shown best in FIG. 5, for securing the lower ends of springs 96 whose upper ends are secured to fastening members 97 which are coupled to collars 98. The collars 98 threadedly engage elongated threaded members 99 which, in turn, are secured to the machine frame by mounting brackets 100. The lower ends of members 99 are provided with tapped openings (not shown) each of which receives a threaded member 101, the lower end of which bears against the upper surfaces of elongated plates 85. Members 101 are each made adjustable in either the upward or downward direction, and once adjusted, may be firmly maintained in this position by a pair of nuts 102–103. The members 101 limit the upward movement of plates 85. Brackets 104, which are each secured to an associated elongated plate 85 near its left-hand end by fastening members 105, act to guide members 101 into alignment with plates 85 as they move toward one another. Springs 96 are under tension, causing the plates 85 to be urged generally in the upward direction to maintain the signatures passing between rollers 65 and 74 under constant compression. The shaft 82 of roller 74 may be positioned anywhere along the length of elongated opening 86 for a purpose to be more fully described.

Figure 4C:
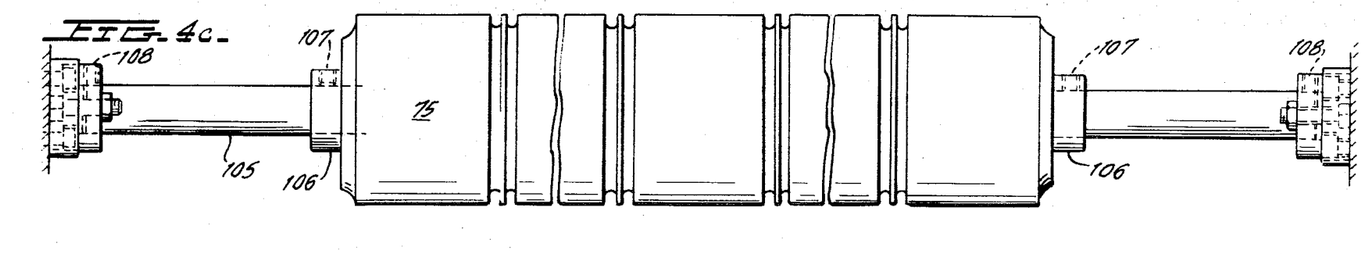
FIG. 4c is a side view of another roller shown in FIG. 1.

Roller 75, shown best in FIGS. 1 and 4c, is mounted upon shaft 105 and restrained from experiencing any movement along its longitudinal axis by stop members 106, each of which is provided with a setscrew 107. The shaft 105 is secured to a pair of mounting brackets 108 which, in turn, may be adjustably positioned along the length of an elongated slot 110 provided in each one of a pair of elongated plates 109 which are secured at their right-hand ends by fastening means 111 to the machine frame. The adjustability of rollers 74 and 75 allows the positioning of the conveyor wires entrained therearound in a manner to promote the formation of a neat stack of signatures in a manner to be more fully described.

Figure 5:
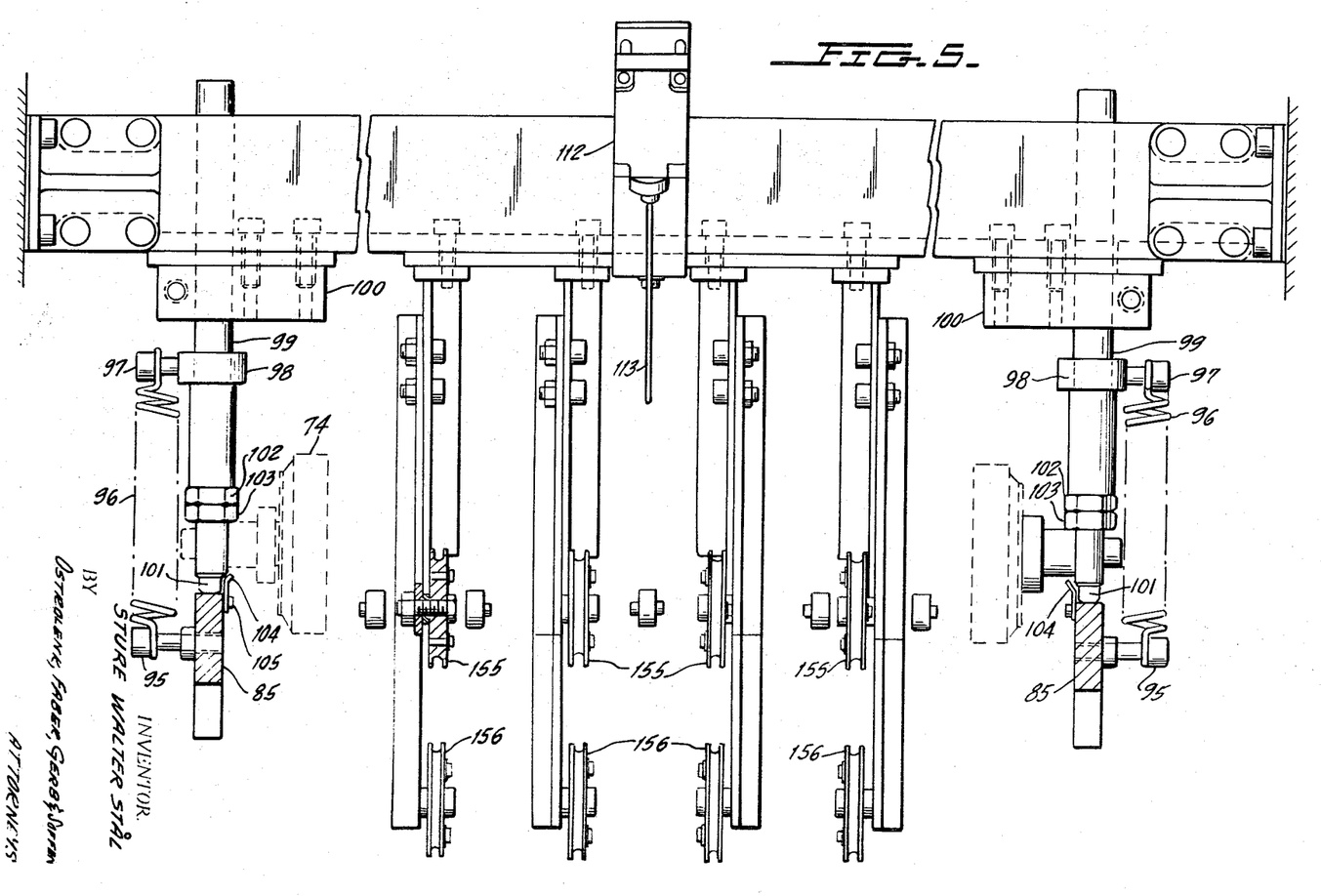
FIG. 5 is an elevational view looking in the direction of arrows 5—5' of FIG. 1.

A microswitch 112 is secured to the machine frame at a point intermediate the rollers 19 and 65, and is provided with a slender elongated sensing finger 113, as shown best in FIGS. 1 and 5. The sensing finger 113 is shown in the normal position which it occupies in the absence of signatures passing through the infeed conveyor downstream section. In the presence of a signature stream, the sensing finger 113 is lifted in the direction shown by arrow 114, causing the microswitch to close its electrical circuit (which is otherwise normally opened in the absence of a signature stream). The closure of microswitch 112 allows the bucket drive motor (to be more fully described) to remain energized to drive the buckets through the stacking region. If, for any reason, there is a stoppage in the signature stream, this condition will be sensed by microswitch 112, causing the bucket drive motor to be immediately deenergized.

The signature stacking section 20 of FIG. 1 is comprised of a plurality of sprockets 120, 121, 122 and 123 which, although not shown in detail, are each actually comprised of a pair of sprockets having drive chains 124 entrained therearound. The drive chains are provided with links 125, each of which mechanically couples the back supports 126a of stacking buckets 126 (five of which are shown being coupled to the drive chains in FIG. 1). The drive chains 124 are driven by a bucket drive motor 127 having an output shaft 128 coupled by either a sprocket or pulley 129 and a drive belt or chain 130 to the input pulley or sprocket 131 of a slip clutch 132. Pulley or sprocket 131 is mounted upon shaft 133 which is the input shaft of slip clutch 132. The output shaft 134 of slip clutch 132 has an output sprocket or pulley 135 which drives a chain 136 entrained about sprocket 135 and sprocket 136 mounted upon a common shaft 137 with sprocket 122. One suitable slip clutch mechanism is set forth in detail in copending U.S. application Ser. No. 724,156 filed Apr. 25, 1968, now U.S. Pat. No. 3,497,053 issued Feb. 24, 1970, and assigned to the assignee of the present invention. For purposes of understanding the present invention it is sufficient to understand that the slip clutch functions to allow continuous operation of the bucket drive motor 127 while the buckets are brought to periodic stops in a manner to be more fully described. Obviously, any other slip clutch mechanism may be employed so long as it functions in the above manner.

The energization of the bucket drive motor causes the pair of drive chains 124 to drive the buckets generally in an upward direction, as shown by arrow 138, as the buckets are returned toward the stacking region and for driving the buckets generally downwardly in the direction shown by arrow 139 through the stacking region.

Figure 6:
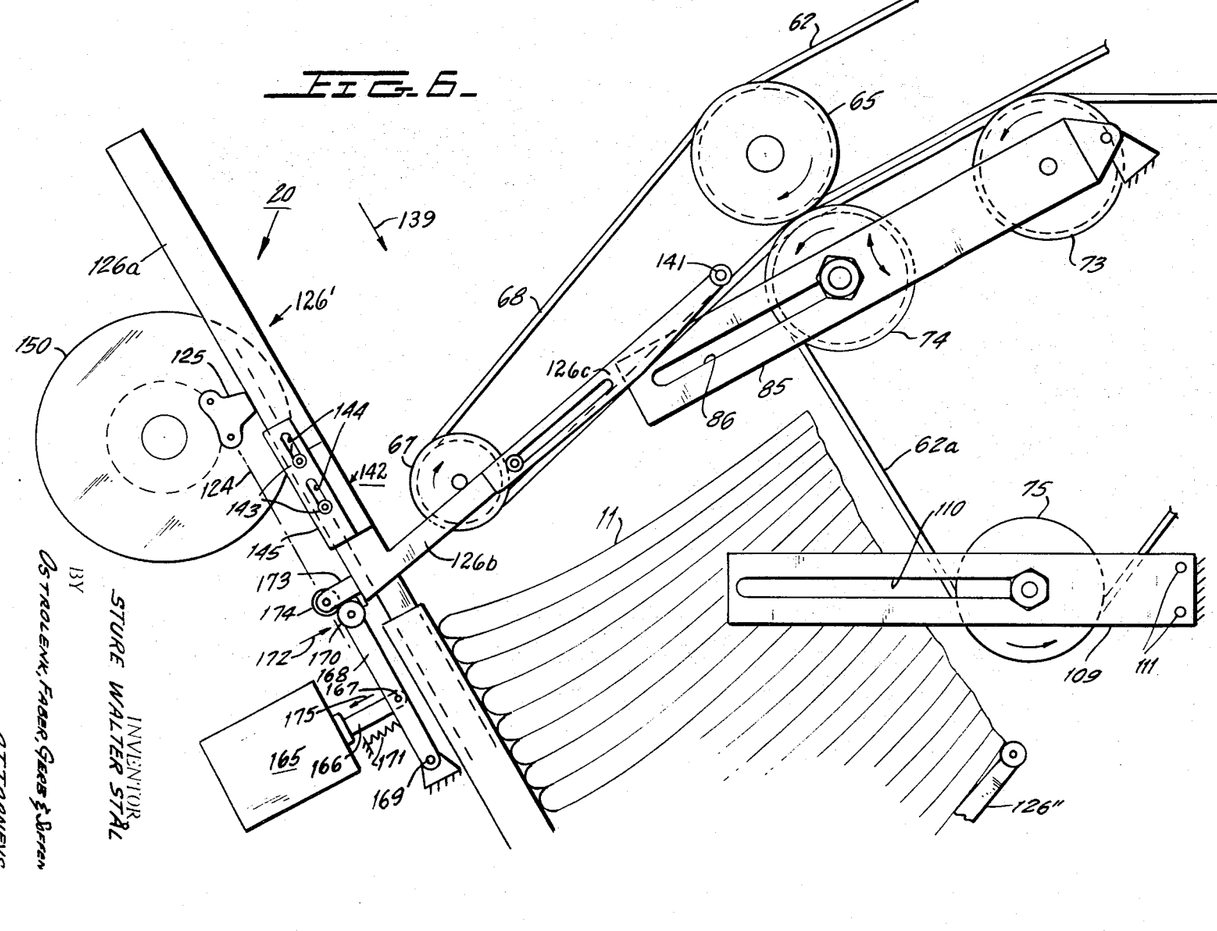
FIG. 6 is an elevational view showing the stacking portion of FIG. 1 in greater detail.

Each bucket 126 is provided with a plurality of tines 126b which are substantially rigidly secured to the back supports 126a. The tines are each provided with an extension arm 126c, each of which, in turn, is provided with an elongated slot 126d for receiving a fastening member 140. The extension arms 126c may be moved either outwardly or inwardly along their associated tines 126b for the purpose of receiving and stacking signatures of greater or lesser dimensions, respectively. The forward ends of each extension arm are provided with pivotally mounted rollers 141 which act to prevent any damage to the signatures at the time that the signature stream is intercepted by the forward ends of the extension arms. Each of the buckets 126 is free to experience a limited amount of movement relative to the drive chains by means of limited lost-motion assemblies 142 provided along their back support sections. A pair of such lost-motion assemblies are secured to the two outermost back support members adjacent the location where the drive chains are positioned. A more detailed view of the lost-motion mechanism 142 is shown in FIG. 6. The back supports 126a are provided with projections 143 which move within elongated slots 144 provided in brackets 145 which, in turn, are secured to the drive chains 124 by means of the coupling members 125 provided at spaced intervals along the drive chains. Spring means (not shown) are coupled between the drive chains and the back supports of the buckets to normally urge the buckets to move in the direction of movement of the drive chains, as shown by arrows 138 and 139. The bucket moved into the intercept position is momentarily restrained by a latching mechanism (to be more fully described). At this time, the chains 124 continue moving until the projections 143 bear against the upper ends of their associated elongated slots 144, at which time the chain is then abruptly restained from moving. This is the time at which the slip clutch assembly allows continued operation of the motor in spite of the fact that the buckets and chains have been brought to a stop. The relative movement between the buckets and the drive chains 126 and 124, respectively, causes the spring means (not shown) to become charged. The discharge of the spring means occurs abruptly upon release of the latching mechanism to very rapidly accelerate the bucket in the intercept position into the signature stream for separation thereof. The use of the spring means more rapidly accelerates the buckets beyond the acceleration imparted thereto by reinitiation of the movement of drive chains 124, causing a very rapid and clean interception of the signature stream. One suitable lost-motion mechanism which may be employed in the present invention is set forth in detail in copending U.S. application Serial No. 527,436, filed Feb. 15, 1966, now U.S. Pat. No. 3,429,239 issued Feb. 25, 1969, assigned to the assignee of the present invention. For this reason, a more detailed description of the lost-motion assembly will be omitted herein for purposes of simplicity.

The shafts which rotatably support sprockets 120 and 121 each rotatably support a plurality of pulleys 150 and 151 (only one of which is shown as being mounted on each shaft), which pulleys receive a plurality of associated belts 152, each of which may be provided with a plurality of small raised portions 153 arranged at substantially closely spaced intervals along the outer surface of each of said belts. The belts are further entrained about rollers 154 positioned along the rear side of the stacking assembly and rollers 155 and 156 rotatably mounted in the front section of the stacking assembly, as shown best in FIG. 5. The belts are positioned so as to be exposed through the spaces between the back supports 125a of each bucket so that the belts 152 make engagement with the forward folded edges of the signatures. The raised projections 153 urge the forward folded edges of the signatures downwardly, causing the signatures to be neatly stacked upon the bucket receiving the signatures. The speed of movement of belts 152 is greater than the speed of movement of the buckets in passing through the stacking regions to effectively urge the signatures being stacked downwardly.

A pair of jostling plates 160 (only one of which is shown in FIG. 1) is positioned on opposite sides of the buckets in the stacking region and experiences vibratory movement for the purpose of jostling the sides of the signatures being stacked to form a very neatly stacked signature bundle. Vibration is imparted to the plates 160 by means of a vibrator motor 161 whose output shaft drives an eccentrically mounted arm 162, transmitting the rotating motion into vibratory motion by means of the assembly 163.

A latching mechanism for latching each bucket in the intercept position is comprised of a solenoid 165 having an armature 166 pivotally linked at 167 to an arm 168, the lower end of which is pivotally coupled at a suitable location along the machine frame at 169. The upper end of arm 168 is provided with a roller 170. Spring means 171 positioned between the machine frame and arm 168 normally urges arm 168 in a direction shown by arrow 172. As a bucket moves into the intercept position (shown best in FIGS. 1 and 6), the roller 170 which lies in the path of movement of a projection 173 provided on the rear of each bucket bears against the under side of this projection to prevent the bucket from experiencing any downward movement. Each projection 173 is provided with a pivotally mounted roller 174 for facilitating release of the latch release mechanism.

As soon as the bucket ahead of (i.e., downstream of) the bucket in the intercept position receives the desired number of signatures, the sensing device 58 generates a pulse which actuates solenoid 165, urging its armature 166 in the direction shown by arrow 175. This moves pivotally mounted arm 168 in the direction of armature 166 against the force of spring 171, causing the release of roller 170 from projection 173, allowing the bucket in the intercept position to be rapidly accelerated downwardly by the force of the spring means previously described which is provided in the lost-motion mechanism, as well as the reinitiation of movement of the drive chains 124.

The drive chains move the bucket downwardly through the stacking region to a point where they pass between a plurality of rollers 180 arranged in spaced parallel fashion so as to permit the passage of the bucket tines therebetween. The rollers 180 form the outfeed conveyor section which is comprised of a drive motor 181 having a sprocket 182 mounted on its output shaft which couples rotation thereof to sprockets 183 by means of a drive chain 184 entrained around these sprockets.

A suitable mechanism is provided for coupling the rotation of sprockets 183 to the rollers 180 for the purpose of moving the formed signature bundle in a direction transverse to the movement of the buckets. As can clearly be seen, each bucket passes through the rollers 180 depositing the bundle thereon so that the signature bundle may, in turn, be delivered out of the machine to a subsequent station for a wrapping or tying operation (not shown).

A sensing switch 185 which may be a microswitch is provided with a slender sensing finger 187 which projects substantially into the path of a downwardly moving signature bundle. If, for any reason, the bottommost signature, in being ejected from the infeed conveyor toward a bucket, is intertwined about the bucket tines or extension arms, this will prevent a stacked bundle from being properly ejected by the outfeed conveyor assembly. Such a condition will be sensed by the sensing finger 187 which will be deflected generally downwardly for such an intertwined signature, causing the microswitch 185 to open its normally closed circuit and terminate energization of the bucket drive motor 127.

The operation of the assembly is as follows:

The signature stream is delivered from a printing press, for example, by means of a conveyor (not shown) which may be positioned in close proximity to roller 14 to smoothly transfer the signature stream from such conveyor upon the conveyor wires 13. The speed of movement of signatures through the infeed conveyor is maintained constant and is higher than the speed at which the signatures are delivered to the assembly of FIG. 1. By driving the signatures at a constant speed, better control can be exerted over the stacking operation since the buckets can be driven through the stacking region at a speed which is in direct relationship to the speed of the infeed conveyor section. The alternative to this arrangement would be to drive the infeed conveyor section at the speed of the conveyor delivering the signature stream thereto. This would place the bucket drive at the disadvantage of not being in an exact relationship with the infeed conveyor speed due to speed changes which may occur in the delivery conveyor. Also the speed changes may affect the rate at which the signatures are ejected from the infeed conveyor toward the stacking buckets, which can affect both neatness of the signature bundles and the accuracy of the count.

The incoming signatures are firmly compressed between upper and lower mangle rollers 15 and 18 which act to squeeze all of the air captured between the sheets of each signature as well as captured between adjacent signatures so as to facilitate the accuracy of the stacking operation. The squeeze roller assembly is highly effective in compressing the signatures as a result of the great mechanical advantage provided by the elongated lever arms 23 which constantly maintain the signature stream in compression by means of the air cylinders.

The signature stream passes beneath the sensor 58 which counts the number of signatures and generates a signal each time a predetermined number of signatures passes the sensor for the purpose of controlling the solenoid 165 to release the next bucket in the intercept position as soon as the downstream bucket has received the appropriate number of signatures.

The upstream section of the infeed conveyor which includes the sensor 58 moves the signature stream in an inclined upward direction until the signature stream reaches a point downstream of the sensor 58, at which time the downstream section of the infeed conveyor, which is tilted in a downward direction, bends the signature stream, causing it to move in a direction which is inclined generally downwardly. The signatures, in passing between the two sections of the infeed conveyor, are caused to be bent, which further serves to compress the signatures and remove any air captured therein. The downward tilt of the infeed conveyor downstream section further provides a more rapid ejection of signatures into the stacking buckets which allow the stacking operation to be performed at very much diminished speeds, when desired or required, without any harmful effect upon the neatness of each bundle and the accuracy of each bundle count. Deflection of the microswitch sensor arm 113 in the presence of a signature stream closes the microswitch providing power to the bucket drive motor. If, for any reason, a gap in the signature stream occurs, sensor arm 113 moves to its undeflected position immediately cutting power which is otherwise supplied to the bucket drive motor 127.

As the signature stream passes roller 65 it is deflected slightly further in the downwardly inclined direction by means of the conveyor belts entrained around rollers 65, 66 and 67. In order to assure the fact that a clean interception of the signature stream will occur, it is most desirable that the forward ends of the extension arms be positioned as close as possible to the stream. The forward ends of the extension arms of bucket 126', which is shown in FIGS. 1 and 6 in the intercept position, can be seen to lie above the signature stream passing between rollers 65 and 74 and in very close proximity to the stream. This arrangement requires very little movement of the bucket from the intercept position before it actually intercepts the stream. The distance between the forward ends of the extension arms and the signature stream can be made quite small as a result of the manner in which the rollers 65 and 74 are mounted. As was previously described, roller 65 which is free to rotate about its longitudinal axis is nevertheless mounted in a rigid fashion so as to be prevented from experiencing any movement transverse to its longitudinal axis. This prevents the conveyor wires entrained about rollers 65 through 67 from experiencing any appreciable vibratory or oscillating motion to the extent that signatures would be permitted to rise above the forward ends of the extension arms provided on the bucket latched in the intercept position so as to prematurely load a signature thereon. Since the signature stream which is arranged in overlapping fashion will impart some vibratory motion to the infeed conveyor, the compression of the signature stream is maintained between rollers 65 and 74 by spring loading the mounting plates 85 in the manner shown best in FIG. 5 to allow for changes in thickness of the signature stream while at the same time permitting very close positioning of the bucket in the intercept position to the signature stream.

The signatures leaving the infeed conveyor section are stacked upon bucket 126" until a predetermined count is reached. This predetermined count is generated in counter 58 which emits a signal for energization of solenoid 165 to release the bucket 126' in the intercept position which is rapidly accelerated in the downward direction to intercept the signature stream in a very clean fashion so that the last signature to be stacked upon bucket 126" will pass to this bucket and the next signature will be caused to be directed upon the tines of the bucket just released from the intercept position.

As the signatures are delivered to the buckets, their side edges are jostled by the jostling plates 160 which urge the signatures into a very neat stack. The belts 152 having the raised projections bear against the forward folded edges of the signatures, urging them downwardly to somewhat compress the bundle being formed.

The rearward cut edges of the signatures lie in very close proximity to the section of conveyor wires passing between rollers 74 and 75 which forms a moving abutment or guide for the signatures being stacked. This portion of the wires which is arranged substantially parallel to the rearward cut edges furthermore helps to withdraw the falling signatures to their correct position in the bundle in a manner substantially similar to the belts 152 by causing the signatures to be compressed or urged downwardly upon the bucket being stacked.

In order to very accurately separate the signature stream and further in order to deliver all of the signatures to the bucket being stacked so that their forward folded edges will all lie against the rear supports 126a of each bucket, it is important that the signatures experience as little free fall as is possible. This objective is achieved by adjustably positioning roller 74 as close as possible to the stacking region so that the conveyor wires entrained around roller 74 and passing between roller 74 and roller 75 will be arranged in parallel relative to the rear cut edges of the signatures. The actual positions of the rollers 74 and 75 is dictated by the outer dimensions of the signatures being stacked. Movement of the rollers 74 and 75 to the extreme left-hand ends of elongated openings 86 and 110, respectively, enables signatures of reduced size to be stacked. FIG. 1 shows the rollers 74 and 75 positioned to receive signatures of maximum dimensions. It should be noted that while the elongated slots 86 are inclined at an angle, slots 110 are substantially aligned with the horizontal direction so as to maintain proper tension of the conveyor wires regardless of which position is assumed by the rollers 74 and 75. For example, as roller 74 is moved downwardly and toward the left (as shown in FIG. 1), roller 75, in moving in the same direction, is nevertheless brought closer to roller 74 so as to reduce the increased tension brought about by movement of the roller 74 generally toward the left. Conversely, movement of the roller 74 generally toward the right, which would otherwise release tension of the conveyor wires, is complemented by a movement of the roller 75 toward the right which, in turn, moves roller 75 further away from roller 74 to maintain the appropriate tension. Thus, aligning the conveyor wire section passing between rollers 74 and 75 so that it is substantially parallel to the rear cut edges of the signatures, automatically maintains proper tension of the conveyor wires.

Since the signatures will experience some bending after they pass between rollers 65 and 74, it is very important to position the forward ends of the bucket tines as close to this point as possible to assure the fact that the interception of the stream will occur in a very clean and accurate manner. This very close positioning is made possible by means of the adjustable extension arms previously described. Obviously, the extension arms may be moved outwardly in the case where signatures of larger dimensions are being stacked, and, conversely, may be moved inwardly in cases where signatures of smaller dimensions are being stacked. The distinct advantage of this arrangement is that more accurate control of the interception is exerted by closely positioning the forward ends of the bucket tines to the stream so that the signatures being delivered will have little opportunity to experience any bending. If the tines were moved further away from rollers 65 and 74, not only would the signatures experience some bending, but they would be found to bend nonuniformly from signature-to-signature, thereby greatly complicating the separation and stacking operations.

If desired, the functions of signature separation and limitation of the amount of free fall experienced by each signature may still be obtained through the use of roller 74, and roller 75 may be eliminated, if desired, wherein the conveyor wires would be entrained only about rollers 20, 73 and 74. However, it is preferred that roller 75 and its adjustable feature be provided in order to enhance the stacking operation performed by the section of the conveyor wires passing between rollers 74 and 75.

The latching mechanism halts each bucket in the intercept position as the bucket moves to the position occupied by bucket 126'. This very accurately locates the forward ends of the extension arms relative to the signature stream. Release of the latching mechanism occurs as was previously described, causing each bucket to be rapidly accelerated into the signature stream for a very clean interception thereof. The bucket 126'' which now contains a signature bundle of an accurate count is caused to pass through the outfeed conveyor rollers 180 (in the manner shown by bucket 126'''). The signatures deposited upon rollers 180 are fed in a direction transverse to the movement of the buckets to suitable conveyor or tables (not shown) where they may then be wrapped or tied. Suitable means (not shown) may be provided in the outfeed conveyor section for alternating the outfeed direction so that alternate bundles may be fed to opposite sides of the assembly.

If, for any reason, a signature becomes intertwined about the tines of a bucket, the sensing arm 187 will be urged generally in the downward direction, causing disconnection of electrical power to the bucket drive motor 127, permitting rapid access to the assembly for the purpose of moving the intertwined signature. If desired, both of the sensing switches 112 and 185 may further provide sound and/or lamp indications of an alarm condition.

It can be seen from the foregoing description that the present invention provides a novel assembly for conveying, separating and stacking signatures, and the like, wherein very accurate control of the separation and stacking operations is exerted upon the signature stream by virtue of the compression of the signature stream to remove any air captured within the stream, the close positioning of the intercepting buckets to the downstream end of the infeed conveyor, the tilting of the infeed conveyor downstream section in an inclined fashion to promote ejection of the signatures to the extreme rearward edges of the buckets, and the provision of an adjustable lower conveyor to promote the formation of a neatly stacked bundle, as well as limiting the free fall of each signature to the minimum amount possible as determined by the width of the signatures.

Although this invention has been described with respect to its preferred embodiments, it should be understood that many variations and modifications will now be obvious to those skilled in the art, and it is preferred, therefore, that the scope of this invention be limited not by the specific disclosure herein, but only by the appended claims.

What is claimed is:

1. Means receiving a stream of signatures for delivery to a location where the signatures are separated and stacked comprising:
    first and second conveyors receiving said stream therebetween for guiding said stream along a predetermined linear path;
    said first conveyor supporting said stream;
    means for driving at least one of said first and second conveyors for rapidly urging said stream therebetween;
    said conveyors being diagonally aligned with the upstream end being at a higher elevation than the downstream end;
    a plurality of signature-receiving means adapted to successively move along an inclined path which path is arranged transverse to said conveyors and is located immediately adjacent the downstream end of said second conveyor for receiving said signatures;
    said signature receiving means comprising a plurality of stacking buckets arranged at spaced intervals;
    means for moving said buckets past the downstream end of said conveyors along an imaginary straight line arranged along said inclined path;
    said second conveyor being positioned to support said signature stream and being comprised of at least first and second rotatably mounted rollers arranged in spaced parallel fashion;
    conveyor belts being entrained around said rollers;
    said first and second rollers being positioned in close proximity to the upstream and downstreams ends, respectively, of said first conveyor;
    first means for adjustably positioning said second roller along an inclined path colinear with said conveyors and extending between a downstream position closer to said stacking buckets and an upstream position further removed from said stacking buckets.

2. The device of claim 1 wherein each of said buckets is comprised of a back support and a plurality of tines forming the bottom support for each bucket extending from the bottom of said back support toward the second conveyor;
    each of said tines including extension arms each being adjustably mounted upon an associated tine;
    means for securing each extension arm to its associated tine along said tine from a first position wherein the free end of said extension arm is closer to its associated back support to a second position wherein the free end of said extension arm if further removed from its associated back support.

3. The device of claim 2 wherein said extension arms are each comprised of hollow elongated members telescoped upon their associated tine;

each hollow member being provided with an elongated slot;

fastening means engaging said tines and passing through an associated slot for positioning its associated hollow member along the length of the tine.

4. The device of claim 1 wherein said first means is comprised of a pair of plates each having an elongated slot;

fastening means for securing the associated roller along the length of said slots.

5. Means receiving a stream of signatures for delivery to a location where the signatures are separated and stacked comprising:

first and second conveyors receiving said stream therebetween for guiding said stream along a predetermined linear path;

said first conveyor supporting said stream;

means for driving at least one of said first and second conveyors for rapidly urging said stream therebetween;

said conveyors being diagonally aligned with the upstream end being at a higher elevation than the downstream end;

a plurality of signature-receiving means adapted to successively move along an inclined path which path is arranged transverse to said conveyors and is located immediately adjacent the downstream end of said second conveyor for receiving said signatures;

said signature-receiving means comprising a plurality of stacking buckets arranged at spaced interval;

means for moving said buckets past the downstream end of said conveyors along an imaginary straight line arranged along said inclined path;

said second conveyor being positioned to support said signature stream and being comprised of at least first, second and third rotatably mounted rollers arranged in spaced parallel fashion;

conveyor belts being entrained around said rollers;

said first and second rollers being positioned in close proximity to the upstream and downstream ends, respectively, of said first conveyor;

said third roller being positioned below said first and second rollers;

first means for adjustably positioning said second roller along a first inclined path extending between a downstream position closer to said stacking buckets and an upstream position further removed from said stacking buckets.

6. The device of claim 5 further comprising:

second means for adjustably positioning said third roller along a second path arranged at a spaced angle relative to said first path and extending between a first position closer to said stacking buckets and a second position further away from said stacking buckets to position the portion of the conveyor belts entrained about said first, second and third rollers and passing between said second and third rollers to be positioned substantially parallel to the path of movement of said buckets for facilitating the stacking operation.

7. The device of claim 5 wherein said first and second means are each comprised of a pair of plates each having an elongated slot;

fastening means for securing the associated roller along the length of said slots.

8. The device of claim 7 wherein said pair of plates comprising said first means is aligned relative to the pair of plates comprising said second means to maintain the conveyor belts under substantially the same tension whenever the belts passing between said second and third rollers are arranged parallel to the path followed by the stacking buckets regardless of the actual position assumed by said first and second rollers along their respective slots.

* * * * *